(12) United States Patent
Beauchamp et al.

(10) Patent No.: US 10,408,415 B2
(45) Date of Patent: Sep. 10, 2019

(54) HEATER PLATE FOR VEHICLE LIGHT HEATING

(71) Applicant: Valeo North America, Inc., Troy, MI (US)

(72) Inventors: Jon Beauchamp, Hope, IN (US); John Orisich, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 29 days.

(21) Appl. No.: 15/647,412

(22) Filed: Jul. 12, 2017

(65) Prior Publication Data

US 2019/0017677 A1    Jan. 17, 2019

(51) Int. Cl.
    F21S 45/60      (2018.01)
    F21V 15/01      (2006.01)
    F21S 41/141     (2018.01)
    F21S 41/20      (2018.01)
    B60Q 1/00       (2006.01)

(52) U.S. Cl.
    CPC ............ *F21S 45/60* (2018.01); *B60Q 1/0017* (2013.01); *F21S 41/141* (2018.01); *F21S 41/20* (2018.01); *F21V 15/01* (2013.01); *B60Q 1/0005* (2013.01)

(58) Field of Classification Search
    CPC .......... F21S 45/60; F21S 41/141; F21S 41/20; F21V 15/01; B60Q 1/0005; B60Q 1/0017; H05B 3/84

USPC ......................................................... 362/294
See application file for complete search history.

(56) References Cited

U.S. PATENT DOCUMENTS

| | | | |
|---|---|---|---|
| 1,951,902 A * | 3/1934 | Dempsey | F21V 29/90 219/220 |
| 3,495,259 A | 2/1970 | Rocholl et al. | |
| 4,280,173 A * | 7/1981 | Bradley | F21S 45/40 362/294 |
| 6,563,086 B1 | 5/2003 | Meirndorf et al. | |
| 6,601,983 B1 * | 8/2003 | Runfola | B60S 1/026 362/545 |
| 2005/0115943 A1 | 6/2005 | Winter et al. | |
| 2006/0011598 A1 | 1/2006 | Yasuda | |
| 2006/0245202 A1 | 11/2006 | Moreth et al. | |
| 2015/0055363 A1 | 2/2015 | Van Straten | |
| 2016/0109088 A1 | 4/2016 | Orr et al. | |
| 2016/0208997 A1 * | 7/2016 | Silvi | F21S 48/325 |
| 2018/0058654 A1 * | 3/2018 | Blusseau | F21S 41/692 |

* cited by examiner

*Primary Examiner* — Bao Q Truong
*Assistant Examiner* — Jessica M Apenteng
(74) *Attorney, Agent, or Firm* — Oblon, McClelland, Maier & Neustadt, L.L.P.

(57) ABSTRACT

A vehicle light assembly, a heater plate, and a method for vehicle light heating. The vehicle light assembly includes an outer lens and a heater plate. The heater plate is moveable between a stowed position and a deployed position, the heater plate being situated in operative relationship with the outer lens and the heater plate being energized when in the deployed position.

20 Claims, 6 Drawing Sheets

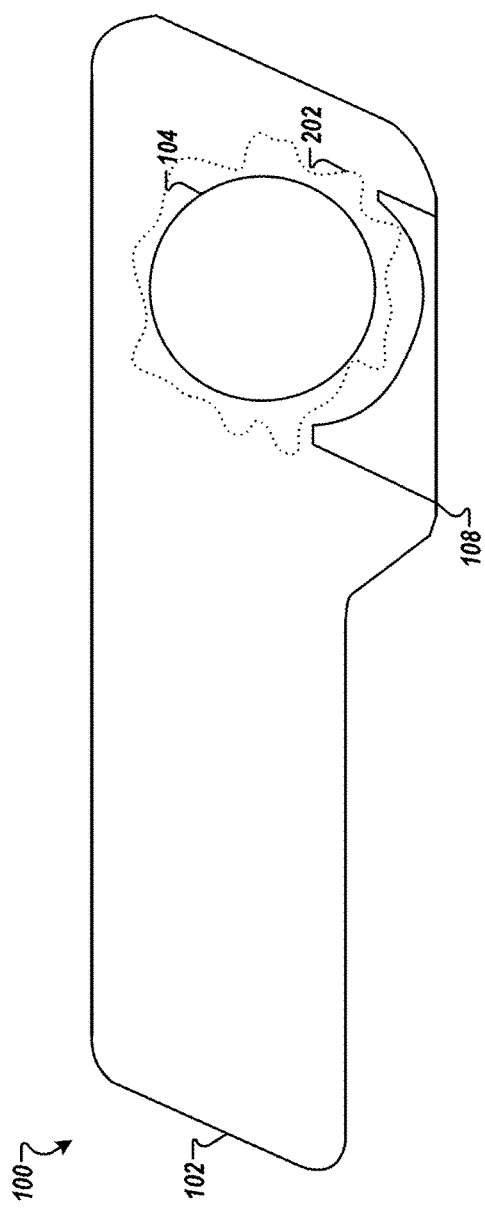

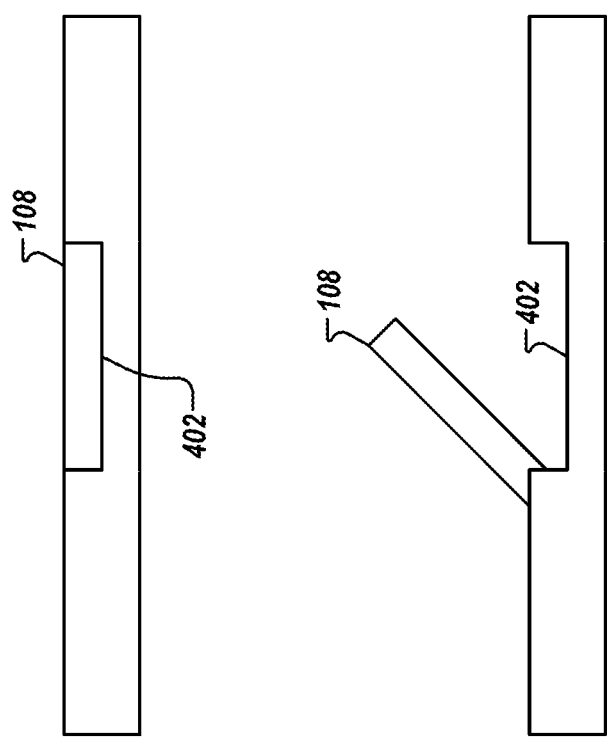

HEATER PLATE FOR VEHICLE LIGHT HEATING

BACKGROUND

This disclosure relates to a vehicle light assembly and a heater plate in order to melt snow and ice and remove condensation from lenses of the vehicle light assembly.

Vehicles function in a range of environments and often encounter condensation or ice forming on surfaces of the various components of the vehicle, including headlamp components. Ice buildup on exterior vehicle components, such as the headlamps and rear lights, is a common problem. A typical headlamp assembly comprises an outer housing that receives a reflector and a lens. The reflector has a light source, such as a light emitting diode (LED) or a discharge lamp, for example. The housing is typically closed at the front by glass or plastic constituting a transparent cover or lens, which allows the emergence therethrough of light produced by the light source and reflected by the reflector. The optical members, such as the reflector or similar apparatus, are placed within the chamber forming a light beam from the light produced by the light source.

Existing solutions for de-icing and for condensation removal do not allow for fast and efficient de-icing/condensation removal. In addition, existing solutions are not aesthetically pleasant to consumers.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

An aspect of the present disclosure includes a vehicle light assembly. The vehicle light assembly includes an outer lens and a heater plate. The heater plate is moveable between a stowed position and a deployed position, the heater plate being situated in operative relationship with the outer lens and the heater plate being energized when in the deployed position.

In one embodiment, the heater plate is situated at a predetermined distance from an inner surface of the outer lens when in the deployed position.

In one embodiment, the predetermined distance is on the order of about 10.0 mm or less.

In one embodiment, the heater plate is substantially parallel to the outer lens when in the deployed position.

In one embodiment, the vehicle light assembly a housing and wherein the heater plate is angled at a predetermined angle with respect to the bottom side of the housing when in the deployed position.

In one embodiment, the bottom side of the housing includes a groove, and wherein the heater plate is configured to fit in the groove when in the stowed position.

In one embodiment, the groove has a profile matching a predetermined shape of the heater plate.

In one embodiment, the heater plate is of a predetermined shape, the predetermined shape generally blends or is generally visually imperceptible.

In one embodiment, the heater plate includes a heating element.

In one embodiment, the vehicle light assembly further comprises a vehicle light configured to provide a cone of light; and wherein the heater plate has a predetermined shape as a function of the cone of light.

In one embodiment, the vehicle light assembly further comprises a drive system configured to move the heater plate between the deployed position and the stowed position.

In one embodiment, an amount of power delivered from the heater plate ranges from 10 W to 20 W.

In one embodiment, the heater plate has a rectangular shape.

Another aspect of the present disclosure includes a heater plate for use in a vehicle light assembly. The heater plate includes a driving system configured to move the heater plate from a stowed position to a deployed position and from the deployed position to the stowed position; and a heating element. The heating element is activated when in the deployed position.

Another aspect of the present disclosure includes a method for operating a heater plate. The method includes determining, using processing circuitry coupled to the heater plate, whether a heating mode is to be activated; moving the heater plate from a stowed position to a deployed position when the heating mode is to be activated; and energizing the heater plate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a schematic that shows a front view of the vehicle light assembly according to one example;

FIG. 4 is a schematic that shows a portion of a housing of the vehicle light assembly;

DETAILED DESCRIPTION

Figure 1:
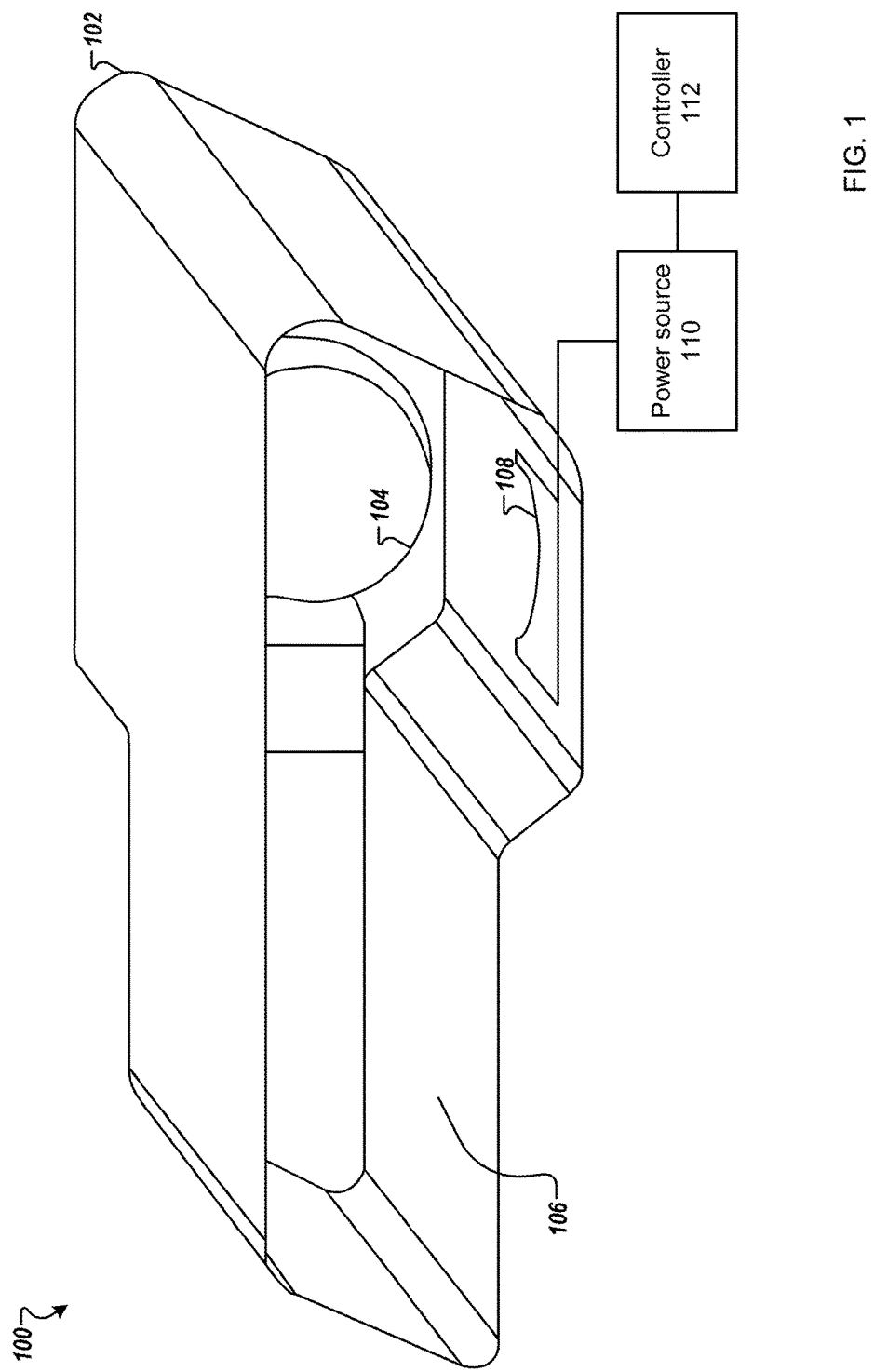
FIG. 1 is a schematic that shows a vehicle light assembly according to one example.

Referring now to the drawings, wherein like reference numerals designate identical or corresponding parts throughout several views, the following description relates to a vehicle light assembly including a heater plate and a heating system in order to melt snow and ice and remove condensation from lenses of the vehicle light assembly.

FIG. 1 is a schematic that shows a vehicle light assembly 100 according to one example. The vehicle light assembly 100 may be a headlamp and/or trail lamp assembly. The vehicle light assembly 100 includes a housing 102, a light source 104, and an outer lens 106. Outer lens 106 may be formed of an optical grade material, such as polycarbonate or glass. The vehicle light assembly 100 may be used in a lighting and/or signaling device such as a headlamp or a tail lamp on a vehicle.

The light source 104 may be one or more light sources 104 which are operatively mounted in proximity to a reflector in order to reflect light from the one or more light sources 104 and ultimately through the outer lens 106 as would be understood by one of ordinary skill in the art. Depending on the design of the light source 104, the reflector may not be required.

The light source 104 may include one or more light-emitting device or solid state light sources. For example, the light source 104 may include an inorganic semiconductor light emitting diode (LED) or laser diode, an organic light emitting diode (OLED), polymer light emitting diode (PLED), an LED lamp package, LED chip or LED die, or an array of one or more of these devices. Where a plurality of LEDs is used they can be the same or different colors. It should be understood that light source 104 can be multiple discrete LEDs or an LED light bar. A halogen and/or high intensity discharge (HID) source may also be used for light source 104.

As is known, the shape of the vehicle light assembly 100 can vary dramatically depending on style of the vehicle and the packaging requirements, thus FIG. 1 is merely illustrative of a possible headlight assembly shape.

A heater plate 108 (shown in the stowed position) may be mounted on the bottom side of the housing 102 to reduce condensation on the inner surface of the outer lens 106 and to prevent or device ice buildup on the outer surface of the outer lens 106.

The heater plate 108 is configured to be movable between a stowed position and a deployed (i.e., in use position). When in the deployed position, the heater plate 108 is activated to heat the outer surface of the outer lens 106. The heated air travels upward across the inner surface of the outer lens 106, thereby facilitating de-icing or removing condensation from the outer lens 106.

The heater plate 108 may be coupled to a power source 110. The power source 110 may be a conventional lighting harness (not shown) associated with the vehicle light assembly 100 such as a vehicle battery or alternator. The power source 110 may be under control of a controller 112 as described further below.

The heater plate material can be selected from a variety of metals, including thermally conductive polymers, stainless steels and nickel alloys, titanium, magnesium, molybdenum, tungsten, copper, aluminum, and combinations or alloys of the same.

In one implementation, the heater plate 108 may include one or more heating elements which may be operable independently of one another. In one implementation, the one or more heating elements may be contained within the heater plate 108. Heating elements may be formed of copper or other base material that would operate within the voltage and current limitations for removing condensation or deicing from the vehicle light assembly 100. For example, the heating element may be a conventional conductive copper wire. For example, heating element may operate at a voltage of 12-24 VDC/VAC. Moreover, heater plate 108 may have specific resistance as determined by the required power density, operating voltage, and specific lens area in order for the heater plate 108 to be capable of removing an average of 8 grams of ice/cm$^2$ of lens area over a maximum of 10 minute duration when the vehicle light assembly 100 has been held at −20 C temperature for a period not shorter than 12 hours.

The total power (in watts) can be determined by multiplying the effective area of outer lens 106 required to be cleared of water based contamination (in cm$^2$) times the power per lens area (i.e., intensity or irradiance). Thus, resistance of the heater plate 108 or heating elements is dependent upon the type of material used to make the resistive heating plate as well as its dimensions.

In one implementation, the area of the lens to be heated is first determined by considering the area(s) of the lens that light passes through for the lamp function(s) that will be active (or desired) when lens heating is necessary. From this data, the required heater power is determined using ambient temperature set to the lowest defined operating temperature of the light source 104, an assumed water based contamination layer on the outer lens 106 (approximately 2 mm thick), and lens material and thickness. Other considerations include the vehicle light assembly 100 internal air temperature prediction based on previously acquired parameters and heat dissipation from the light source 104, time desired/required to remove the water based contamination, assumed air convection coefficient inside and outside of the vehicle lamp assembly 100, latent heat of fusion of ice, density of ice, and heat capacity of all material in the heat transfer paths (including the ice). This information is used to determine the amount of power required from the heater plate 108 to melt the ice in the desired/required time. In one implementation, the amount of power required may be between 10-20 W.

In one implementation, heating element may be formed by depositing a layer of indium tin oxide (ITO) metal film on a polyester sheet. In one example, the heating elements may be embedded in the heater plate 108.

The heater plate 108 is of a predetermined shape so that it is visually pleasant and blends in when the heater plate 108 is in the deployed position and becomes generally visually imperceptible when the heater plate 108 is in the stowed position.

FIG. 2 is a schematic that shows a front view of the vehicle light assembly 100 according to one example. The light source 104 provides a cone of light 202. The heater plate 108 has a shape such that the heater plate 108 does not interfere with the optical performance of the vehicle light assembly 100. For example, the top section of the heater plate 108 may be of a circular shape such that not to interfere with the cone of light 202. The actual shape, design, and type of the heater plate 108 will vary according to vehicle requirements, for example based on the cone of light 202 shape and dimension. In one implementation, the heater plate 108 may have a rectangular shape and have a size of 20 mm×180 mm.

The heater plate 108 may be movable using a drive system (e.g., actuator) driven by an electrical motor (not shown) to move the heater plate 108 from its stowed position to its deployed position and vice-versa. Electric actuation of the heater plate 108 or any other variation of electromechanical actuation that may rotate the heater plate 108 may be used. The drive system is operatively connected to the controller 112 configured to control the drive system, which in turn can control the movement of the heater plate 108. As described later herein, the controller 112 can also be operably coupled to at least one sensor. For example, the controller 112 can command the drive system to enable movement or to move the heater plate 108 toward the deployed and stowed positions based on information provided by the at least one sensor that provides input data to control the heater plate 108.

The heater plate 108 may be connected to the housing 102 by a base hinge. The base hinge is movable between the stowed and deployed position.

In one implementation, an actuator may be operably coupled to the bottom of the housing 102 and to the heater plate 108. For example, the heater plate 108 can be coupled to an output shaft of the actuator by a pivot pin allowing the heater plate 108 to rotate relative to the housing 102.

In one implementation, the controller 112 can include a computing system and can be configured with instructions to control the movement of the drive system, to communicate with external devices. For example, the controller 112 may communicate monitoring status of condensation/deicing status based on information provided by a sensor (e.g., temperature sensor). The controller 112 may determine based on the information whether the de-icing and/or condensation removal is completed.

The controller 112 may execute a method for controlling the heater plate 108 as shown and described in FIG. 5 below via computer instructions. Various sensors may also be utilized by the controller 112 to control the power or current applied by the power source 110 to provide a predetermined amount of heat for a predetermined period of time. The sensors may include at least one of a temperature, humidity, or light sensor.

Figure 3B:
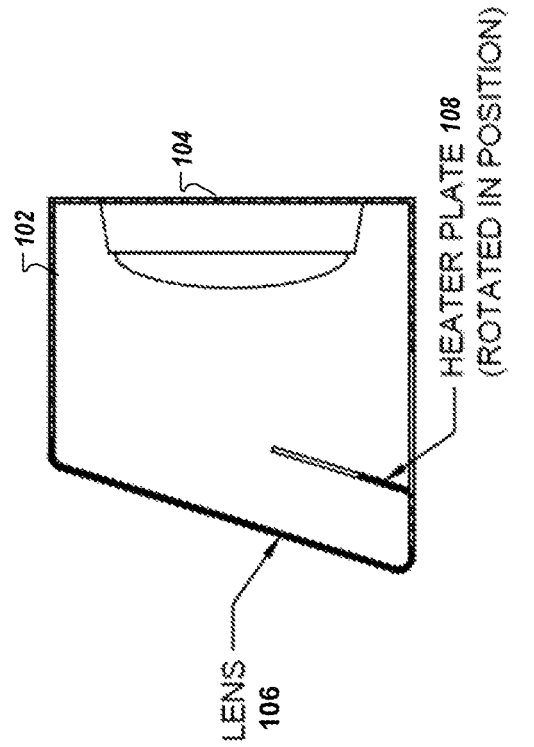
FIG. 3B is a sectional view of the vehicle light assembly shown in FIG. 1.
Figure 3A:
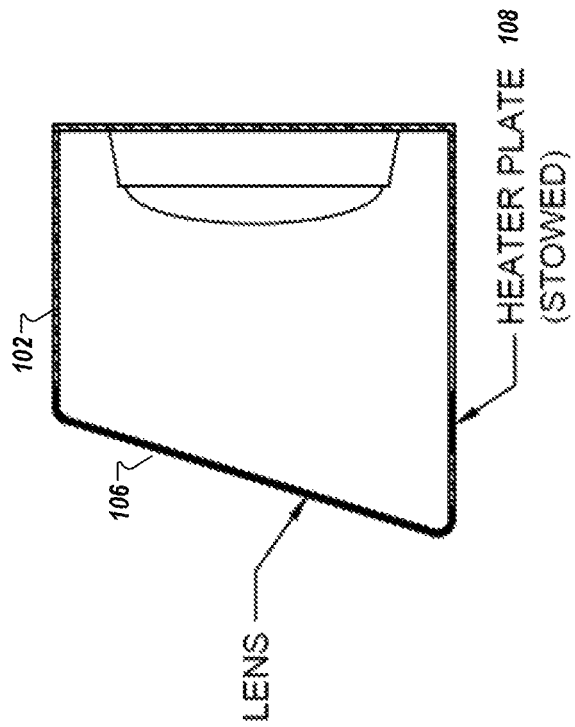
FIG. 3A is a sectional view of the vehicle light assembly shown in FIG. 1.

FIG. 3A is a cross section view of the vehicle light assembly 100 that shows the heater plate 108 in the stowed position. FIG. 3B is a cross section view of the vehicle light assembly 100 that shows the heater plate 108 in the deployed position according to one example. In one implementation, the heater plate 108 is substantially parallel to the outer lens 106 when in the deployed position. The pivotal movement of the heater plate 108 may be in the clockwise or counter clockwise direction. The limit of pivotal movement in the clockwise direction is shown in FIG. 3A (this defines the stowed position of the heater plate 108).

The heater plate 108 is positioned approximately 10 mm or less from the inner surface of the outer lens 106 when in the deployed position. In one implementation, the heater plate 108 is preferably positioned between 3 to 6 mm from the inner surface of the outer lens 106.

In one implementation, the heater plate 108 may be configured to be positioned at multiple angles with respect to the stowed position (i.e., intermediate positions). Each position may provide a different working distance from the outer lens 106 which may be used for condensation versus de-icing or based on the extent of de-icing.

FIG. 4 is a schematic that shows a section of the bottom surface of the housing 102 according to one example. The bottom side of the housing 102 may include a groove 402 having a profile matching the predetermined shape of the heater plate 108 such that the heater plate 108 may be able to fit in the groove 402 when in the stowed position so that it becomes generally visually imperceptible, for example during the daytime when the vehicle light assembly 100 may not be active. The groove 402 may have a depth substantially equal to the heater plate 108 thickness. The location of the groove 402 may be based on the predetermined distance from the inner surface of the outer lens 106.

Figure 5:
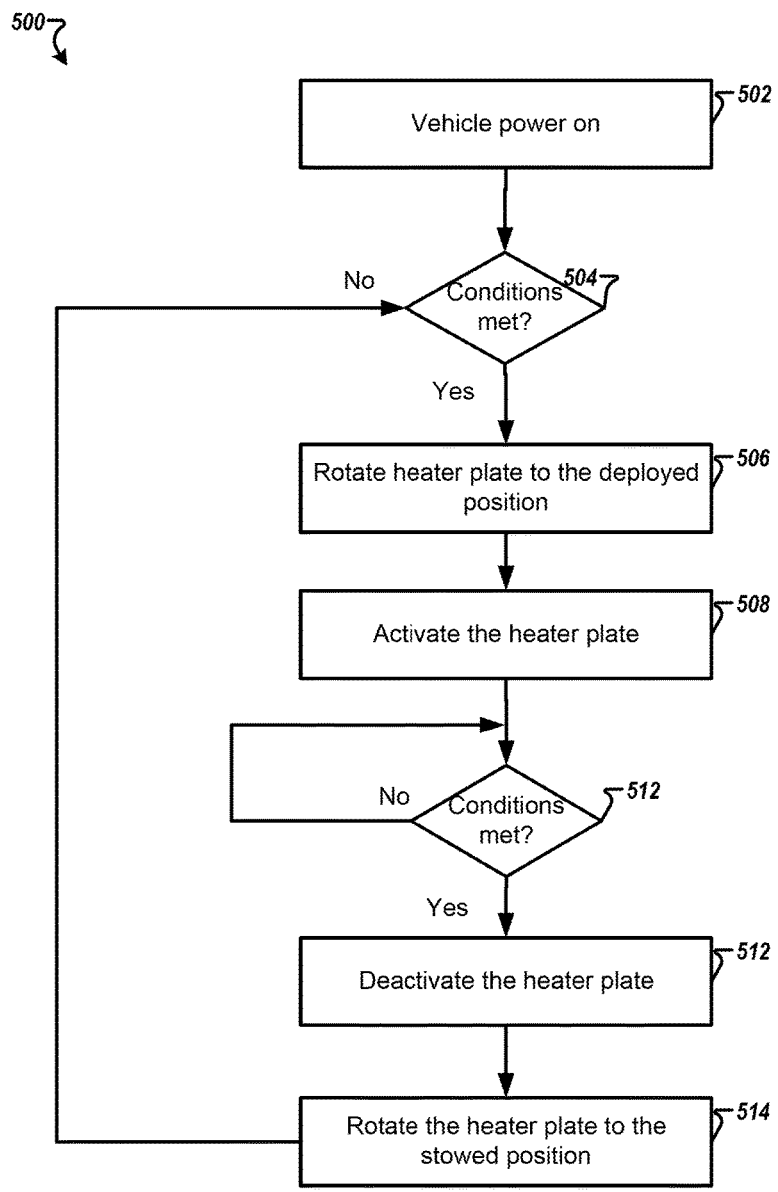
FIG. 5 is a flowchart that shows a method for controlling a heater plate according to one example.

FIG. 5 shows a method 500 for controlling the heater plate 108 according to one example. The method 500 may be performed by the controller 112.

The method 500 may begin at block 502 where it is determined whether the vehicle is powered on. At step 504, the controller 112 determines whether conditions are met for de-icing/condensation removal. In one embodiment, the controller 112 may check whether the vehicle light assembly 100 is active (e.g., automatically or by the operator of the vehicle) then the controller 112 may analyze data from one or more sensors to determine whether de-icing/condensation removal is needed. The controller 112 may also check to see whether de-icing/condensation removal is requested by an operator of the vehicle. In addition, the controller 112 may determine whether a de-icing or a condensation removal mode is called for. If deicing and/or condensation removal is not called for, then the heater plate 108 remains in the stowed position. The controller 112 may perform a wait and then check. If conditions are met, resulting in a "yes" at step 504 then either de-icing or condensation removal has been requested and the routine proceeds to step 506.

At step 506, the controller 112 activates the heater plate 108 into the deployed position. In one implementation, the deployed position may be a function of deicing or condensation removal mode. At step 508, the heater plate 108 is activated. The controller 112 continues energizing the heater plate 108 at the predetermined de-icing temperature for the predetermined de-icing time.

At decision step 510, the controller 112 determines whether de-icing and/or condensation removal is completed. If the de-icing and/or condensation removal is completed, resulting in a "yes" at step 510, then the process continues to step 512. At step 512, the heater plate 108 is deactivated.

At step 514, the heater plate 108 is rotated to the stowed position. For example, the controller 112 may output a control signal to the driving system of the heater plate 108 to rotate the heater plate 108 to the stowed position. Then, the process may go back to decision step 504. The process may terminate when the vehicle is powered off or the vehicle light assembly 100 is deactivated.

The depicted order and labeled steps are indicative of one embodiment of the presented method 500. Other steps and methods may be conceived that are equivalent in function, logic, or effect of one or more steps or portions thereof, of the illustrated method 500. Additionally, the format and symbols employed are provided to explain the logical steps of the method 500 and are understood not to limit the scope of the method 500.

Although the flow charts show specific orders of executing functional logic blocks, the order of executing the block blocks may be changed relative to the order shown, as will be understood by one of ordinary skill in the art. Also, two or more blocks shown in succession may be executed concurrently or with partial concurrence. For example, the heater plate may be energized (step 508) and then rotated to the deployed position (step 506).

In one implementation, a manual heater mode may be in addition to the automatic control, and can be used by the operator of the vehicle to activate the heater plate 108.

Figure 6:
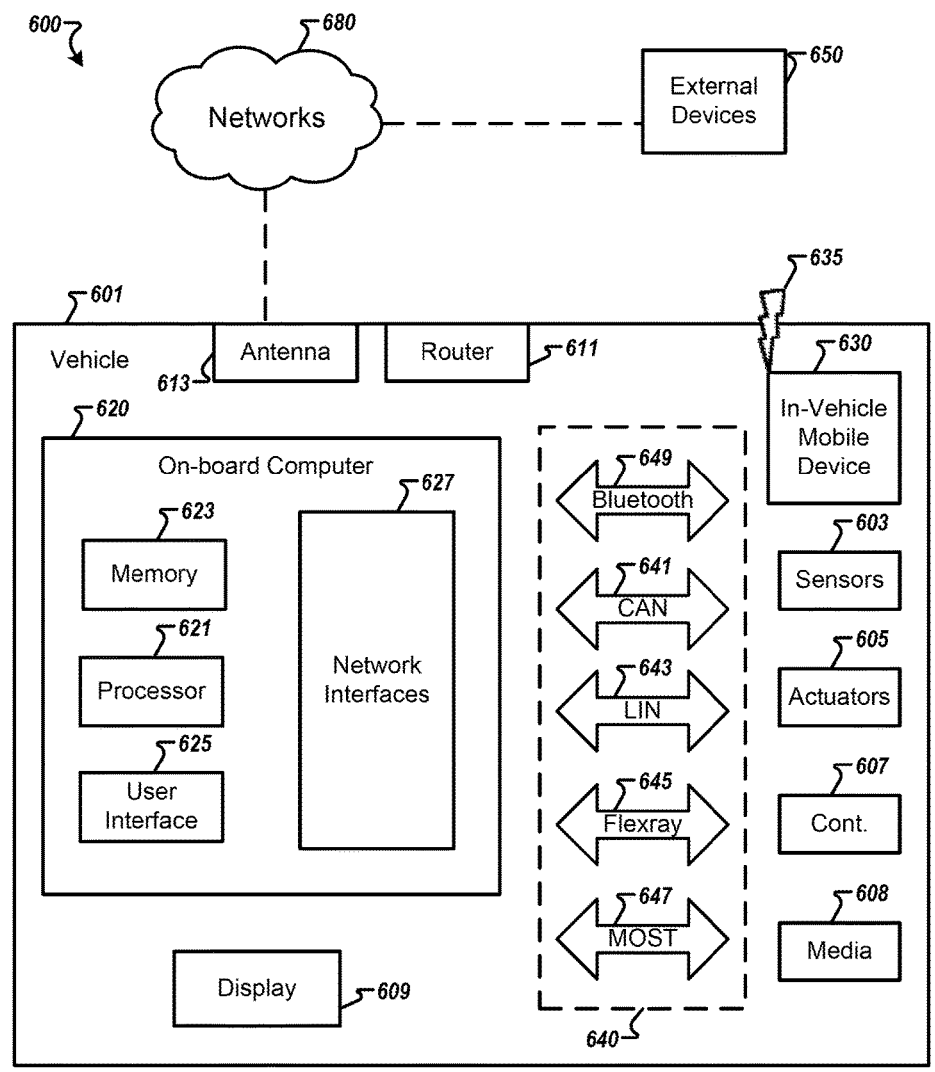
FIG. 6 is an exemplary block diagram of a controller according to one example.

FIG. 6 is a simplified block diagram of a vehicle environment 600 in which embodiments of the invention disclosed herein may be implemented. The vehicle environment 600 includes a vehicle 601 in communication with one or more external devices 650 by way of one or more external networks 680. Vehicle 601 also includes various internal networks 640 for interconnecting several vehicle devices within the vehicle as will be discussed below. The vehicle environment 600 may also include one or more in-vehicle mobile device 630. External devices 650 include any device located outside the vehicle 601 such that the external device must communicate with the vehicle and its devices by an external network 680. For example, the external devices may include mobile devices, electronic devices in networked systems (e.g., servers or clients in a local area network (LAN), etc.), on board computers of other vehicles etc. In-vehicle mobile devices 630 are devices which are located within, or in the vicinity of the vehicle 601 such that the in-vehicle mobile device can communicate directly with internal networks 640 of the vehicle 601. In-vehicle mobile devices 630 may also connect with external networks 680 as discussed below.

Vehicle 601 includes vehicle devices integral with or otherwise associated with the vehicle 601. In the embodiment of FIG. 6, vehicle devices include one or more sensors 603, one or more actuators 605, one or more control units 607, one or more media systems 608, one or more displays 609, one or more routers 611, one or more antenna 613, and one or more on board computers 620. The one or more on board computers 620 may correspond to the controller 112. The one or more on board computers may generate signals having a desired duty factor to control one or more vehicle lights. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 601.

Sensors 603 detect various conditions within (or in the immediate vicinity of) the vehicle 601. For example, sensors 603 may be temperature sensors, photosensors, position sensors, speed sensors, angle sensors or any other sensor for detecting a diagnostic condition or other parameter of the vehicle 601 or its ambient environment. Sensors 603 may be passive or "dumb" sensors that provide an analog representative of the sensed parameter, or so called "smart" sensors with integrated memory and digital processing capability to analyze the parameter sensed within the sensor itself. Data from sensors 603 may be used to activate a hazard mode associated with the vehicle light as described previously herein. Actuators 605 cause motion of some mechanical element of the vehicle in response to a control signal. For example, actuators 605 may be hydraulic actuators, pneumatic actuators or electrical/electronic actuators such as a stepper motor. Actuators 605 may be used to move vehicle lighting devices to implement intelligent light, for example.

Actuators 605 may also be "dumb" devices that react to a simple analog voltage input, or "smart" devices with built-in memory and processing capability. Actuators 605 may be activated based on a sensed parameter from sensors 603, and one such sensed parameter may be a physical position of the actuator 603 itself. Thus, the sensors 603 and actuators 605 may be connected in a feedback control loop for diagnostic detection and control of the vehicle 601.

Control units 607 include any embedded system, processor, electronic control unit (ECU) or microcontroller. Control unit 607 may be dedicated to a specific region or function of the vehicle 601. For example, control unit 607 can provide memory and control logic functions for several dumb devices, such as passive sensors 603 and actuators 605. In one embodiment, control unit 607 is an ECU dedicated for controlling one or more lighting devices, for example light source 104, according to embodiments disclosed herein. Typically, numerous ECUs, with different embedded software, may be found in a single automobile and may communicate via internal networks as discussed below.

On-board computer 620 is a vehicle device for providing general purpose computing functionality within the vehicle 601. The on-board computer 620 typically handles computationally intensive functions based on software applications or "apps" loaded into memory. On-board computer 620 may also provide a common interface for different communication networks in the vehicle environment 600. On-board computer 620 includes one or more processor 621, one or more memory 623, one or more user interface 625 (e.g., the operator interface described previously herein), and one or more network interface 627. One or more display 609 and one or more router 611 may be an integral part of the on board computer 610, or distributed in the vehicle and associated with the on-board computer and other vehicle devices. Separate displays 609 may be provided in suitable locations for access by a driver and passengers in the vehicle 601.

On-board computer 620, and other associated or integrated components such as vehicle devices can include one or more memory element 623 for storing information to be used in achieving operations associated with control of one or more vehicle lights as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 600 could be provided in any database, register, table, cache, queue, control list, or storage structure, based on particular needs and implementations, all of which could be referenced in any suitable timeframe.

In example embodiments, the operations for controlling the vehicle light assembly 100 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 623) can store data used for the operations described herein. This includes the memory elements being able to store software, logic, code, or processor instructions that are executed to carry out the activities described in this Specification.

Processor 621 can execute software or algorithms to perform activities to enable control of lighting devices disclosed herein. A processor 621 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 6 may be communicatively coupled to one another by one or more suitable communications medium (wired, wireless, optical) that provides a pathway for electronic communications. Any element in FIG. 6 may act as a network node in communication with any other element of FIG. 6 also acting as a network node. Any suitable network messaging protocol, network topology or network geographic scope may be included in the vehicle environment 600. Thus, embodiments of on-board computer 620 may include one or more distinct interfaces, represented by network interfaces 627, to facilitate communication via the various networks (including both internal and external networks) described herein. Such network interfaces 627 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 627, may include physical ports (e.g., Ethernet, USB, HDMI, etc.), interfaces for wired and wireless internal subsystems, and the like. Similarly, each of the nodes of vehicle environment 600 can also include suitable interfaces for receiving, transmitting, and/or otherwise communicating data or information in the vehicle environment 600.

Multiple internal vehicle networks represented by 640 may exist in the vehicle 601 to provide communication pathways to various vehicle devices distributed throughout the vehicle 601. An internal vehicle network 640 is a collection of nodes, such as vehicle devices, integrated with or otherwise linked to the vehicle and interconnected by communication means. Vehicle networks 640 typically include hard wired bus type networks, each providing communication pathways to particular vehicle devices distributed throughout a vehicle. FIG. 6 shows four examples of such hard wired networks: Controller Area Network (CAN) 641, Local Internet Network (LIN) 643, Flexray bus 645, and Media Oriented System Transport (MOST) network 647.

CAN bus 641 uses a message based protocol, designed for and typically used by automotive applications. The CAN bus 641 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 641 may connect a transmission sensor and an energy sensor to a main engine controller, and a different CAN bus may connect the main engine controller and a main body controller to on-board computer 620. LIN network 643 may be used to sense external conditions such as light, or to control small mechanisms such as door locking systems. For example, LIN bus 643 may connect a driver's seat actuator, temperature controls, and windshield wiper actuators to a main body controller of a CAN bus.

Flexray bus 645 is typically a dedicated network for hard real-time controllers, used for drive-by-wire and/or brake-by-wire applications in which information from the engine and/or wheels of the vehicle 601 is collected and transmitted to appropriate applications and/or data repositories. For example, Flexray bus 645 may connect a chassis module of the vehicle 601 to on-board computer 620 through an appropriate interface, and/or may connect brakes and electronic stability control (ESB) to the chassis module attached to Flexray 645. MOST network 647 can also be found in vehicles for transmitting audio, video, and voice on fiber optics. MOST buses 647 can connect media system 608, to on-board computer 620 through appropriate interfaces, and/or connect a reversing camera and a navigation system to an intermediate device which is connected to computer by MOST bus 647.

Other hard wired internal networks such as Ethernet may be used to interconnect vehicle devices in the vehicle. Further, internal wireless networks 649, such as near field communications, Bluetooth, etc. may interconnect vehicle devices.

External networks 680 may be accessed from vehicle 601 by vehicle devices and in-vehicle mobile devices 630 when a communication link 635 is available. In-vehicle mobile devices 630 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 600. Data may be any type of numeric, voice, video, or script data, or any type of source or object code, or any other suitable information in any appropriate format that may be communicated from one point to another in electronic devices and/or networks. A vehicle router 611 may also be used to access external network infrastructure within range of the antenna 613 of vehicle 601.

Some form of wireless communication is needed to achieve external network connectivity from vehicle 601. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 600 via some network, and such communication may be initiated through any suitable device such as, in-vehicle mobile device 630, display 609, user interface 625, or external devices 650, for example to activate a mode of operation of the heater plate 108.

In-vehicle mobile devices 630, and mobile devices external to vehicle 601, may communicate with on-board computer 620 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 620 through a USB cable or wireless network when, for example, the external mobile device is a diagnostic tool used by a mechanic for servicing vehicle 601.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A system which includes the features in the foregoing description provides numerous advantages. In particular, the heater plate may be mounted proximal to the outer lens while being aesthetically pleasant to consumers. In addition, the heater plate allows for fast and efficient de-icing/condensation removal.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A vehicle light assembly comprising:
   an outer lens; and
   a heater plate configured to be moveable between a stowed position and a deployed position, the heater plate being situated in operative relationship with an inner surface of the outer lens and the heater plate being activated when in the deployed position.

2. The vehicle light assembly of claim 1, wherein the heater plate is situated at a predetermined distance from the inner surface of the outer lens when in the deployed position.

3. The vehicle light assembly of claim 2, wherein the predetermined distance is on the order of about 10.0 mm or less.

4. The vehicle light assembly of claim 1, wherein the heater plate is substantially parallel to the outer lens when in the deployed position.

5. The vehicle light assembly of claim 1, further comprising:
   a housing; and
   wherein the heater plate is angled at a predetermined angle with respect to the bottom side of the housing when in the deployed position.

6. The vehicle light assembly of claim 5, wherein the bottom side of the housing includes a groove, and wherein the heater plate is configured to fit in the groove when in the stowed position.

7. The vehicle light assembly of claim 6, wherein the groove has a profile matching a predetermined shape of the heater plate.

8. The vehicle light assembly of claim 1, wherein the heater plate is of a predetermined shape, the predetermined shape generally blends or is generally visually imperceptible.

9. The vehicle light assembly of claim 1, wherein the heater plate includes a heating element.

10. The vehicle light assembly of claim 1, further comprising:
    a vehicle light configured to provide a cone of light; and
    wherein the heater plate has a predetermined shape as a function of the cone of light.

11. The vehicle light assembly of claim 1, further comprising:
    a drive system configured to move the heater plate between the deployed position and the stowed position.

12. The vehicle light assembly of claim 1, wherein an amount of power delivered from the heater plate ranges from 10 W to 20 W.

13. The vehicle light assembly of claim 1, wherein the heater plate has a rectangular shape.

14. A heater plate for use in a vehicle light assembly, the heater plate comprising:
    a driving system configured to move the heater plate from a stowed position to a deployed position and from the deployed position to the stowed position; and
    a heating element, the heating element being activated when in the deployed position.

15. The heater plate of claim 14, wherein an amount of power delivered from the heater plate ranges from 10 W to 20 W.

16. The heater plate of claim 14, wherein the heating element is formed of copper.

17. A method for operating a heater plate, the method comprising:
    determining, using processing circuitry coupled to the heater plate, whether a heating mode is to be activated;
    moving the heater plate from a stowed position to a deployed position when the heating mode is to be activated; and
    energizing the heater plate.

18. The method of claim 17, wherein the heater plate is situated at a predetermined distance from an inner surface of an outer lens of a vehicle light assembly when in the deployed position.

19. The method of claim 18, wherein the predetermined distance is on the order of about 10.0 mm or less.

20. The method of claim 17, further comprising:
    determining whether the heating mode is to be deactivated;
    deactivating the heater plate in response to determining that the heating mode is to be deactivated; and
    moving the heater plate from the deployed position to the stowed position.

* * * * *